Patented June 10, 1930

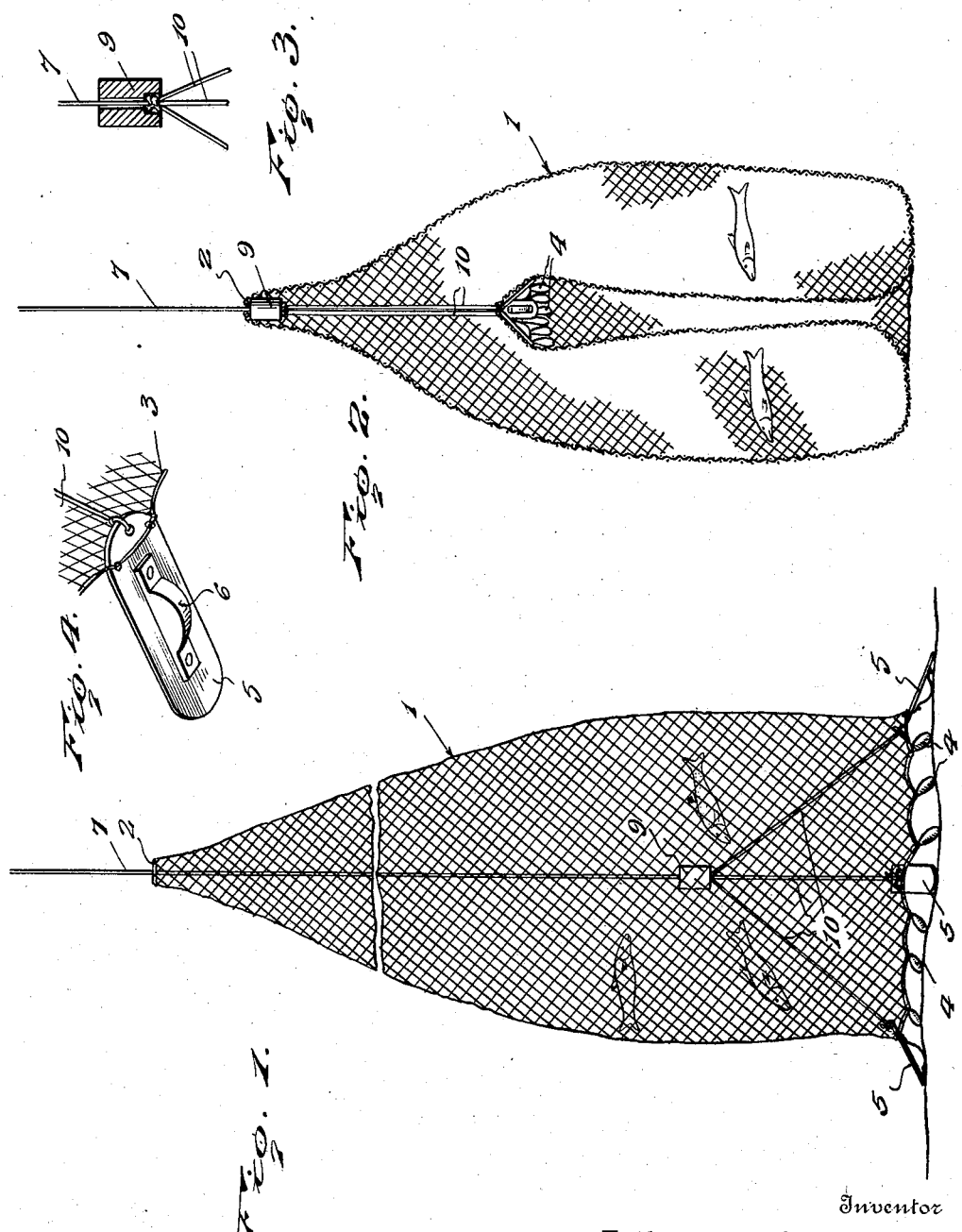

1,762,881

UNITED STATES PATENT OFFICE

JENS K. NICOLAYSON, OF OAKLAND, CALIFORNIA, ASSIGNOR OF ONE-FOURTH TO ANGELO ARCHINI, OF SAN FRANCISCO, CALIFORNIA

FISH TRAP

Application filed May 15, 1929. Serial No. 363,196.

The present invention is directed to improvements in fish traps.

The primary object of the invention is to provide an article of this character so constructed that it can be lowered into the water and as it moves downwardly fish will be caught therein and effectively trapped so that the trap, upon removal from the water, can be quickly manipulated to discharge the catch.

Another object of the invention is to provide an article of this kind so constructed that the lower open end thereof will be properly maintained in position for trapping fish as the net is being lowered in the water.

Another object of the invention is to provide a trap of this nature having novel means for closing the same after it has reached a predetermined depth in order that when the trap is elevated the fish will be prevented from escaping from the trap.

With these and other objects in view, this invention resides in the novel features of construction, formation, combination and arrangement of parts to be hereinafter more fully described, claimed and illustrated in the accompanying drawings, in which:

Figure 1 is a side view of the trap showing the same in its trapping position.

Figure 2 is a vertical sectional view showing the condition of the trap when being elevated.

Figure 3 is a detail sectional view of the stop.

Figure 4 is a perspective view of one of the spreading plates.

Referring to the drawings, 1 designates the net which is of bag-like form, said net being formed of suitable cord and restricted at its upper end. Secured in the restricted upper end is a metallic guide ring 2, the purpose of which will appear later. The lower end of the net is bound with a cord 3 which is secured in any approved manner to the net proper and this cord has secured thereto a number of lead sinkers 4.

Also secured to the cord 3 of the net are metallic plates 5 having weights 6 suitably secured to their under surfaces. These plates may be secured to the cord 3 in any approved manner and serve to spread the cord so that said cord will assume a substantially circular condition as the trap is lowered into the water.

A main cord 7 is provided and has its lower end fixed in the stop 9, said stop being formed from wood or any other suitable material, and connected with this stop is a plurality of draw cords 10 which have their lower ends secured to the plates 5. The cord 7 is freely slidable in the ring 2 and when the cord is pulled upwardly to lift the net the stop 9 engages the ring 2 and causes the draw cords 10 to contract the cord 3 and close the net as shown in Figure 2.

In Figure 1 of the drawings, the net is shown in a position after the same has been lowered in the water. It will be obvious that as the net sinks, the plates 5, due to the fact that the weights 6 are secured to the under surfaces thereof, will tend to hold the cord 3 in circular formation so that when the net is being lowered, fish will be trapped after passing through the lower open end of the net. Since the cord 3 assumes a circular formation as the net is being lowered, fish encountered during the downward movement of the net will enter thereinto.

When the net is about to be lowered into the water the above mentioned guide ring 2 carried by the restricted end is pulled upwardly on the cord 7, at which time the cord 3 will be contracted and the plates 5 and sinkers 4 will be, to some extent, bunched together. However, as the net is lowered in the water the plates 5 will spread, due to the resistance of the water, thus fully opening the cord 3 so that fish encountered as the net is lowered will pass into the interior thereof. In this manner, fish swimming a considerable distance above the river bed will be trapped as well as those near the river bed.

It will thus be seen that a trap has been provided wherein hooks are eliminated so that the fish trapped will be in no way mutilated.

From the foregoing it is thought that the operation and many advantages of the herein described invention will be apparent to those skilled in the art without further description and it will be understood that various changes in size, shape, proportion and minor details of construction may be resorted to without departing from the spirit or sacrificing any of the advantages of the invention.

What is claimed is:

1. A fish trap comprising a net of bag-like formation, said net having a ring in its upper end, a cord binding the lower end of the net to provide an entrance opening, weighted plates secured to the cord, a main cord slidable in the ring and having a stop carried by its lower end, draw-strings connecting the plates and stop, said stop being adapted to engage the ring to lift the net and simultaneously contract the cord forming the entrance opening, as and for the purpose set forth.

2. A fish trap comprising a net of bag-like formation having a restricted upper end provided with a ring and having a lower open end bound by a cord providing an entrance opening, a main cord slidable in the ring and having a stop connected to its lower end, draw cords connecting the first named cord and said stop, sinkers carried by the first named cord, said main cord being operable during upward movement of the net to close the open end thereof.

3. A fish trap comprising a net of bag-like formation having a restricted upper end, a ring secured in said end, said net having an open lower end bound by a cord, weighted plates secured to the cord, a main cord slidable in the ring and having a stop upon its lower end, draw cords connecting the stop and first named cord, said stop being adapted to engage the ring when the main cord is pulled upwardly, said stop, when moved upwardly, serving to cause the draw cords to contract said cord and fold a portion of the net.

In testimony whereof I affix my signature.

JENS K. NICOLAYSON. [L. S.]